(12) United States Patent
Siddam (10) Patent No.: US 9,603,080 B2
(45) Date of Patent: Mar. 21, 2017

(54) NETWORK ASSISTED ANDSF POLICY UPDATING

(71) Applicant: Alcatel-Lucent USA Inc., Murray Hill, NJ (US)

(72) Inventor: Kalyan P Siddam, Cupertino, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 192 days.

(21) Appl. No.: 14/314,724

(22) Filed: Jun. 25, 2014

(65) Prior Publication Data

US 2015/0382282 A1 Dec. 31, 2015

(51) Int. Cl.
| H04W 4/00 | (2009.01) |
| H04W 48/04 | (2009.01) |
| H04W 48/18 | (2009.01) |
| H04W 88/08 | (2009.01) |
| H04W 8/14 | (2009.01) |
| H04W 48/14 | (2009.01) |

(52) U.S. Cl.
CPC .............. *H04W 48/04* (2013.01); *H04W 8/14* (2013.01); *H04W 48/14* (2013.01); *H04W 48/18* (2013.01); *H04W 88/08* (2013.01)

(58) Field of Classification Search
CPC .................................................. H04W 48/08
USPC ........................................................ 370/338
See application file for complete search history.

(56) References Cited

U.S. PATENT DOCUMENTS

| 2014/0066059 A1* | 3/2014 | Patil .................. H04W 48/16 455/434 |
| 2015/0009975 A1* | 1/2015 | Gupta ................. H04W 48/16 370/338 |
| 2015/0063331 A1* | 3/2015 | Scahill ............... H04L 63/0892 370/338 |

* cited by examiner

*Primary Examiner* — Shripal Khajuria
(74) *Attorney, Agent, or Firm* — Mendelsohn Dunleavy, P.C.; Edward Meisarosh; Steve Mendelsohn (57) ABSTRACT

Various methods and apparatuses are provided to address the need for reduced UE location reporting. In one method, an access network discovery and selection function (ANDSF) server receives (401) location information for a UE from a Long Term Evolution (LTE) Evolved Packet Core (EPC) function. The location information is received from the LTE EPC function instead of being received from the UE. The ANDSF server then generates (402) a policy based on the location information received for the UE and sends (403) the policy to the UE via a first access network. The policy includes an identification of an access point for use by the UE to access an access network different than the first access network.

20 Claims, 4 Drawing Sheets

NETWORK ASSISTED ANDSF POLICY UPDATING

FIELD OF THE INVENTION

The present invention relates generally to communications and, in particular, to access network discovery and selection in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

The evolution of cell phone and other communications has yielded numerous protocols and access networks for enabling communication between user equipment (UE) and the Internet or other networks. For example, access networks have been established according to LTE (3GPP), CDMA (3GPP2), WiMAX, and WiFi standards. Increasingly, UEs such as smart phones are implementing the capability to connect to multiple types of access networks. For example, it is now common for smart phones to enable connection to WiFi access networks in addition to a cellular access network such as LTE.

The third generation partnership project (3GPP) has developed standards defining an "access network discovery and selection function" (ANDSF), including enhancements for aiding the UE in automatically selecting alternative access networks for supporting some or all of the network traffic produced by the UE. 3GPP specifies an architecture to assist UE in access network discovery and selection. The architecture includes a client on the UE and a server, within the operator network. A UE reports its location (e.g., GPS, Cell ID) and requests (defined as PULL procedure) Access Network Discovery and Selection Rules (ANDSR). The ANDSF server, taking into consideration subscription, application, operator policy rules, etc., constructs ANDSR for the UE client.

However, the UE periodically reporting its location to the ANDSF Server consumes a considerable amount of UE resources (especially, battery power) and causes additional signaling traffic within the operator network. Thus, new solutions and techniques that are able to mitigate this issue would meet a need and advance wireless communications generally.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, subdivided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY

Various methods and apparatuses are provided to address the need for reduced UE location reporting. In one method, an access network discovery and selection function (ANDSF) server receives location information for a UE from a Long Term Evolution (LTE) network. The location information is received from the LTE Evolved Packet Core (EPC) function instead of being received from the UE. The ANDSF server then generates a policy based on the location information received for the UE and sends the policy to the UE via a first access network. The policy includes an identification of an access network (e.g., Wi-Fi Access Point Identifier, i.e., SSID) for use by the UE to access an access network different than the first access network. An article of manufacture is also provided, the article comprising a non-transitory, processor-readable storage medium storing one or more software programs which when executed by one or more processors performs the steps of this method.

Many embodiments are provided in which the method above is modified. For example, in many embodiments the ANDSF server subscribes to location updates of the UE from a Home Subscriber Server (HSS) in the LTE EPC. In many embodiments the ANDSF server (also or alternatively) requests location information for the UE from a Mobility Management Entity (MME) in the LTE EPC. Depending on the embodiment then, receiving location information for the UE from the LTE EPC involves receiving location information for the UE from an HSS, an MME or another network entity having the UE location information.

An access network discovery and selection function (ANDSF) server is also provided. The ANDSF server includes a network interface in communication with a first access network, a storage device, and a processor in communication with the network interface and the storage device. The processor is configured to receive location information for a user equipment device (UE) from a Long Term Evolution (LTE) Evolved Packet Core (EPC) function. The location information is received from the LTE EPC function rather than from the UE. The processor is also configured to generate a policy based on the location information received for the UE and to send the policy to the UE via the first access network. The policy includes an identification of an access point for use by the UE to access a different access network than the first access network. Many embodiments are provided in which this ANDSF server is modified. Examples of such embodiments can be found described above with respect to the method.

DETAILED DESCRIPTION OF EMBODIMENTS

Figure 1:
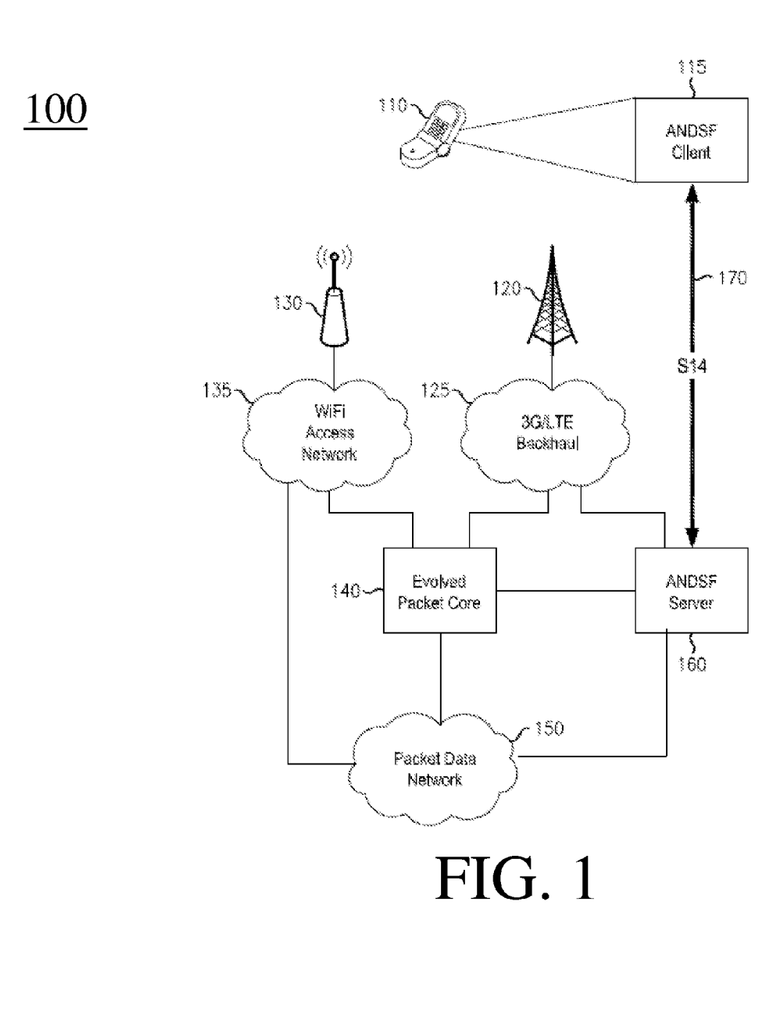
FIG. 1 is a block diagram depiction of an environment for enabling communication via multiple access networks, in accordance with some embodiments of the present invention.
Figure 2:
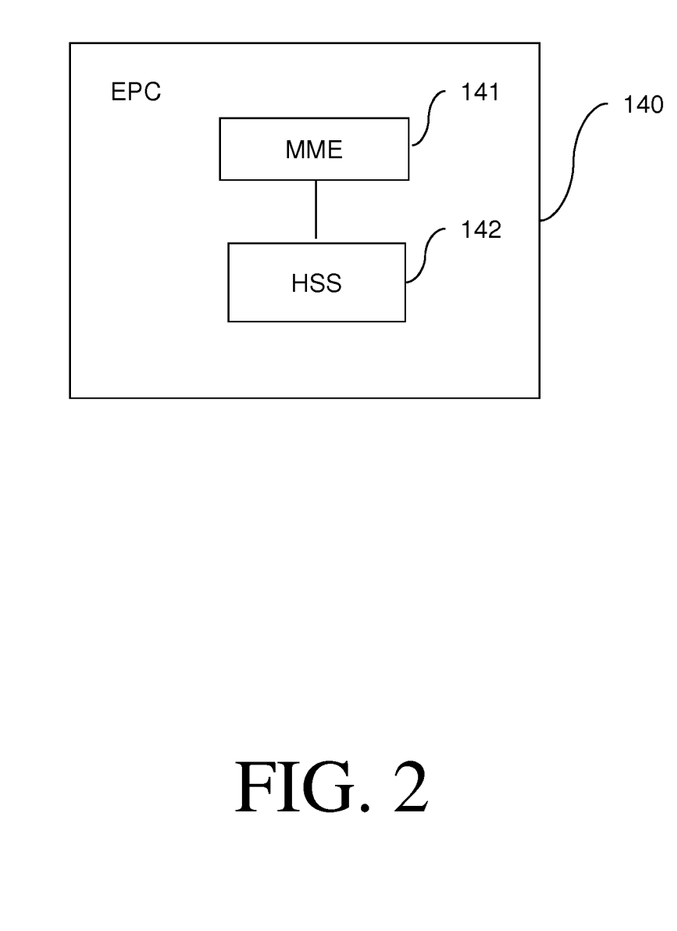
FIG. 2 is a block diagram depiction of an Evolved Packet Core (EPC), in accordance with some embodiments of the present invention.
Figure 3:
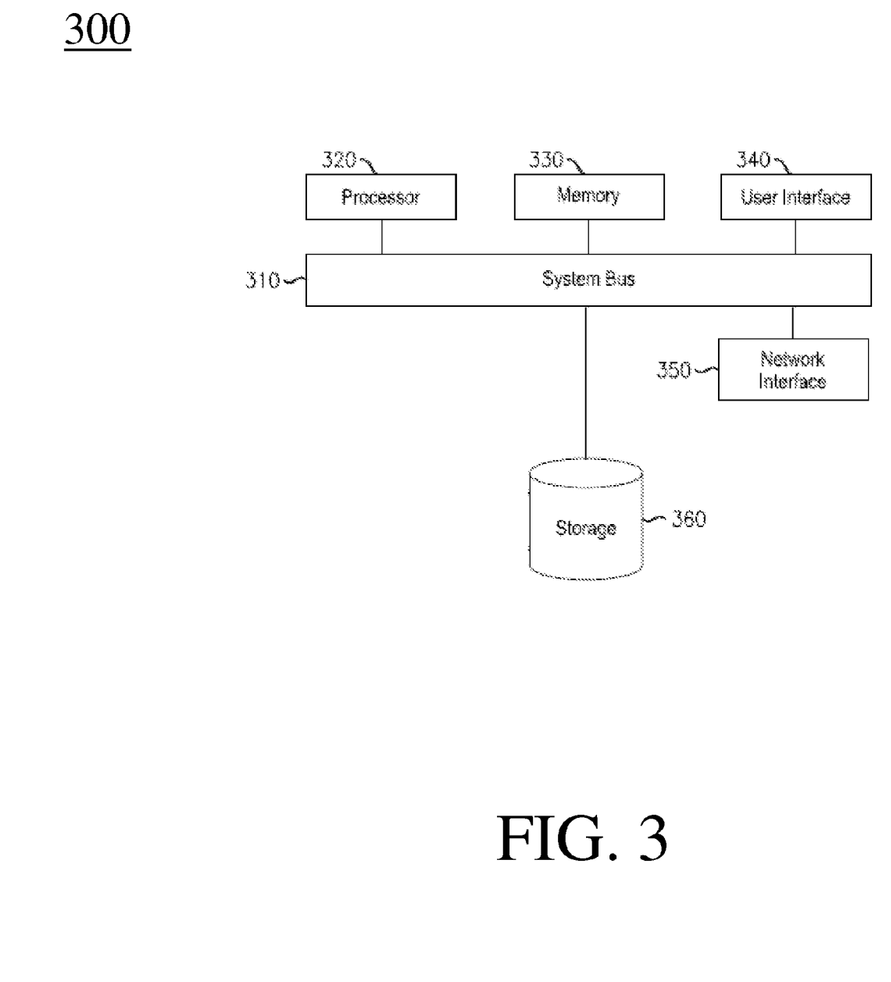
FIG. 3 is a block diagram depiction of an access network discovery and selection function (ANDSF) server, in accordance with some embodiments of the present invention.

To provide a greater degree of detail in making and using various aspects of the present invention, a description of our approach to access network discovery and selection and a description of certain, quite specific, embodiments follow for the sake of example. FIGS. 1-3 are referenced to illustrate an example of a specific system and manner in which the present invention may be embodied.

FIG. 1 depicts an exemplary environment 100 for enabling communication via multiple access networks. The exemplary environment 100 may be a telecommunications network for providing user equipment (UE) 110 with access to a packet data network (PDN) 150, such as the Internet.

The UE 110 is a device that communicates with the packet data network 150 for providing the end-user with one or more data services. Such data service may include, for example, voice communication, text messaging, multimedia streaming, and Internet access. More specifically, in various exemplary embodiments, the UE 110 may be a personal or laptop computer, mobile or smart phone, tablet, television set-top box, or any other device capable of communicating with other devices via a network.

The environment 100 may include multiple routes for the UE 110 to access the PDN 150. For example, as part of a first route, the environment 110 includes a base station 120 and a 3G/LTE backhaul access network 125. The base station 120 may be a device that enables communication between user equipment 110 and the 3G/LTE backhaul access network 125. For example, the base station 120 may be a base transceiver station such as a radio network controller, nodeB, or an evolved nodeB (eNodeB) as defined by 3GPP standards. Thus, the base station 120 may be a device that communicates with the UE 110 via a first medium, such as radio waves, and communicates with the 3G/LTE backhaul access network 125 via a second medium, such as Ethernet cable. In various embodiments, multiple base stations (not shown) may be present to provide mobility to the UE 110.

The 3G/LTE backhaul access network 125 may be a series of routers, such as service aggregation routers, and other network elements configured to transport traffic to devices such as various devices belonging to an evolved packet core (EPC) 140. As will be explained in greater detail below, the EPC 140 may provide controlled and metered access to the PDN 150.

As part of a second route to the PDN 150, the exemplary environment includes a WiFi access point 130 and a WiFi access network 135. The WiFi access point 130 may be a device that enables communication between user equipment 110 and the WiFi access network 135. For example, the WiFi access point 130 may be a wireless router or other access point as defined by IEEE standards. Thus, the WiFi access point 130 may be a device that communicates with the UE 110 via a first medium, such as radio waves, and communicates with the WiFi access network 135 via a second medium, such as an Ethernet cable. In various embodiments, multiple WiFi access points (not shown) may be present to provide mobility to the UE 110.

The WiFi access network 135 may be a series of routers and other network elements configured to transport traffic to devices such as various devices belonging to the EPC 140. As such, traffic that is redirected over the WiFi access network 135 may still be controlled and metered by the EPC 140 as will be detailed further below. Additionally, as shown, the WiFi access network 135 may enable non-seamless WiFi offload by providing a direct connection to the PDN, bypassing the EPC 140.

It will be appreciated that while the exemplary environment 100 is illustrated as including one WiFi access network and one 3G/LTE access network, various embodiments may include alternative or additional access networks. For example, an alternative environment (not shown) may include 3G/LTE access networks, WiFi access networks, WiMAX access networks, 3GPP access networks, or CDMA access networks. It will be apparent that the various principles described herein with respect to the 3G/LTE access network 125 and WiFi access network 135 may be applied to any combination of such access networks to achieve various benefits described herein.

In various embodiments, each of the access points 120, 130 may be associated with one or more identifiers. For example, the WiFi access point 130 may be associated with a unique SSID, or shared SSID along with a unique BSSID. As another example, the cellular access point may be associated with identifiers such as a cell ID, tracking area code (TAC), and location area code (LAC) which may be used to determine the current location of the UE 110.

The EPC 140 includes a collection of devices defined by the 3GPP to provide various services according to an LTE network. For example, the EPC 140 may include service gateways, PDN gateways, policy and charging rules function (PCRF) nodes, subscription profile repositories (SPRs), etc. The EPC 140 may manage UE sessions, authorize the transfer of application traffic to and from the PDN 150 upon request, enforce quality of service (QoS) limits and guarantees, meter network usage, apply charges to a subscribers account, or perform any other functions associated with an LTE EPC.

EPC 140 is depicted in FIG. 2 as including a Mobility Management Entity (MME) 141 and a Home Subscriber Server (HSS) 142, both being particularly relevant to embodiments described herein. Depending on the embodiment, the MME 141 may perform the signaling and control functions to manage the UE access to network connections, the assignment of network resources, and the management of the mobility states to support tracking, paging, roaming and handovers. The HSS 142 stores a variety of user-related information. Depending on the embodiment, the HSS 142 may store some or all of the following information: user identification, numbering and addressing information; user security information, such as network access control information for authentication and authorization; user location information at an inter-system level; and/or user profile information. The HSS 142 also allows subscription to portions of its stored subscriber information for updates to changes to that information.

Various embodiments described herein facilitate the discovery of and selection among the available access networks 125, 135 for transport of data traffic by the UE 110. To this end, the UE 110 includes an access network discovery and selection function (ANDSF) client 115 that communicates with an ANDSF server 160 via an S14 session 170. As shown, the S14 session 170 is established via the 3G/LTE backhaul access network 125; in various embodiments, the S14 session 170 may be established over other available networks such as the WiFi access network 135 or other networks (not shown). In various embodiments, the S14 session may transfer messages on the data plane according to the Open Mobile Alliance (OMA) device management (DM) protocol. Various other protocols for the transfer of messages to implement the functionalities described herein will be apparent. In some embodiments, the ANDSF server 160 may have OMA-DM capability while, in other embodiments, the ANDSF server 160 may interface with an existing mobile device management (MDM) server within the carrier network over a proprietary interface. In some embodiments, the ANDSF sever 160 may support both co-located/embedded OMA-DM and standalone OMA-DM. In various embodiments, the ANDSF Server 160 may additionally or alternatively be connected to the WiFi Access Network 135 or Packet Data Network 150 such that the ANDSF Server 160 may be accessed or may access devices via networks other than the 3G/LTE backhaul network 125.

The ANDSF client 115 may establish the session by first transmitting identifying information (such as a triplet including IMSI, IMEI, and MSISDN values) to authenticate the subscriber using the UE 110. If the ANDSF server 160 is able to authenticate the subscriber as an existing and active subscriber, the ANDSF server 160 may create a new S14 session and transmit an S14 session identifier back to the ANDSF client 115 for use in future communications.

Once the S14 session 170 has been established, the ANDSF server 160 may assist the UE 110 by transmitting access network policies to the ANDSF client 115. As will be described in greater detail below, access network policies may include identifications of available access points, prioritization of access points, criteria for determining when to use various access points, or other information specified by the 3GPP as used by the UE 110 in automatically determining which access networks 125, 135 to utilize. Such policies may be delivered according to multiple procedures. In a PULL procedure, the ANDSF client 115 sends a message to the ANDSF server 160 requesting that access network policies be provided. The request message may include information revealing the current location of the UE 110. For example, the location information may include a current cell identifier, location area code (LAC), tracking area code (TAC), public land mobile network (PLMN) identifier, GPS coordinates, or any other information useful in identifying a location. Based on the location information, the ANDSF server may identify nearby alternative access points and associated priorities, criteria, and other policy information. The generated policy is then returned to the ANDSF client 115 for use.

Alternatively, the ANDSF server 160 may register for location information updates for the UE 110 from the MME 141 or possibly from the HSS 142. The ANDSF server 160 might also or alternatively obtain location information from another network entity such as an entity that estimates user location with reasonable accuracy. For example, a user may report his/her location to an internet browser, and the back end web server may make this location information available for ANDSF. The ANDSF server 160 then generates a policy based on the location information received for the UE 110 and sends it to the ANDSF client 115 (assuming there are any ANDSF policy updates that need to be communicated to the UE).

According to the PUSH procedure, the ANDSF server 160 provides policy information without having recently received a request from the ANDSF client 115. In other words, the ANDSF server 160 pushes an unsolicited set of policy information to the ANDSF client 115. Such a PUSH procedure may be used, for example, when policy information is modified by an operator of the ANDSF server 160 or when specifically requested by the operator or any other trigger on the ANDSF Server (e.g., Subscription change or changes to the network information like addition or maintenance of Wi-Fi network). The pushed policy information may be based on the most recently reported location of the UE 110 or based on location information received from the MME 141 or the HSS 142.

For example, depending on a network operator's deployment of the system, an operator may choose to PUSH applicable policy information to a UE each time the UE enters a broad geographic area (e.g., all policies applicable for New York City). The ANDSF server 160 may subscribe to location updates for the UE 110 from the HSS 142. Upon receiving updated location information for UE 110 from the HSS 142, the ANDSF server 160 may then PUSH applicable policy information to the ANDSF client 115. The MME 141 is able to provide more granular and usually more accurate location information for UE 110 than that stored in HSS 142. (For example, HSS location information may be specified at a tracking area level, while MME location information may be specified at a cell level.) So, if the operator chooses to PUSH applicable policy information to a UE each time the UE enters a more specific geographic area (e.g., all policies applicable for Manhattan), the ANDSF server 160 may instead PUSH applicable policy information to the ANDSF client 115 upon receiving location information for UE 110 from the MME 141.

In various embodiments, upon moving to a new location, the ANDSF client 115 may check a locally-stored policy database to determine whether any previously-received policies apply to the new location. For example, if the UE 110 reenters a previously visited location before the previously-received policies expire, the ANDSF client 115 may locate the policies that were received from the ANDSF server 160 during the last visit to that area. When applicable policies are located locally, the ANDSF client 115 may proceed to utilize those policies, rather than requesting new policies via the S14 session 170. Leveraging this behavior, the ANDSF server 160 is able to pre-provision policies in the ANDSF client 115 for use in the future. For example, the ANDSF server 160 may pre-provision policies based on a user's home/work address, driving habits and/or neighborhoods frequented. Such pre-provisioning may be useful, for example, where the ANDSF server 160 enters a period of relatively low activity and may use extra capacity to generate policies.

FIG. 3 depicts an exemplary hardware diagram of an ANDSF server 300. The exemplary ANDSF server 300 may correspond to the ANDSF server 160 of FIG. 1. As shown, the ANDSF server 300 includes a processor 320, memory 330, user interface 340, network interface 350, and storage 360 interconnected via one or more system buses 310. It will be understood that FIG. 3 constitutes, in some respects, an abstraction and that the actual organization of the components of the ANDSF server 300 may be more complex than illustrated.

The processor 320 may be any hardware device capable of executing instructions stored in memory 330 or storage 360. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The user interface 340 may include one or more devices for enabling communication with a user such as an administrator. For example, the user interface 340 may include a display, a mouse, and a keyboard for receiving user commands.

The network interface 350 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon which the processor 320 may operate. For example, the storage 360 may store ANSDF server instructions for implementing basic ANDSF server functionality such as, for example, S14 session establishment, message processing, and UE/MME/HSS location information processing. The storage 360 may also store policy generation instructions and structures for use in generating policies to be provisioned to ANSDF clients. The storage 360 may also store the S14 sessions along with a copy of ANDSF policies already provided to the ANDSF client. These ANDSF policies may be used to check whether any changes need to be sent to the UE when the ANDSF server receives UE location updates from the MME, HSS or any other network entity that can provide the UE location information.

It will be apparent that various information described as stored in the storage 360 may be additionally or alternatively stored in the memory 330. In this respect, the memory 330 may also be considered to constitute a "storage device." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the ANDSF server 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. In some embodiments, such as those wherein the ANSDF server is implemented in a cloud computing architecture, components may be physically distributed among different devices. For example, the processor 320 may include a first microprocessor in a first data center and a second microprocessor in a second data center. Various other arrangements will be apparent.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 4:
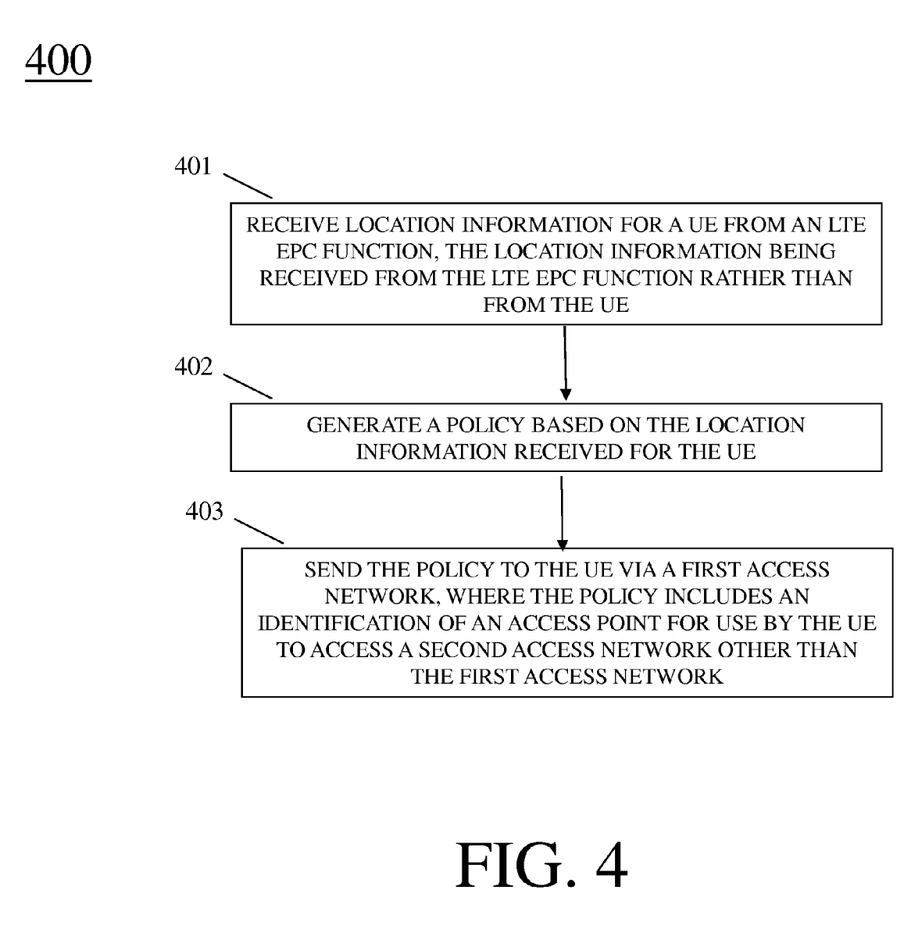
FIG. 4 is a logic flow diagram of functionality performed by an ANDSF server in accordance with various embodiments of the present invention.

Having described certain embodiments in detail above, a review of the more general aspects common to many of the embodiments of the present invention can be understood with reference to FIG. 4. Diagram 400 of FIG. 4 is a logic flow diagram of functionality performed by an ANDSF server in accordance with various embodiments of the present invention. In the method depicted in diagram 400, an ANDSF server receives (401) location information for a UE from an LTE EPC function. The location information is received from the LTE EPC function instead of being received from the UE. This reduces the burden of UE location reporting that currently exists, saving valuable UE resources such as battery life. Instead, location information already available in the network is used by the ANDSF server.

Depending on the embodiment, the ANDSF server may subscribe to location updates of the UE from an HSS, an MME or both. Additionally or alternatively, the ANDSF server may request or obtain location information for the UE from an MME or another network entity that can provide UE location information with reasonable accuracy. Depending on the embodiment then, the ANDSF server may receive location information for the UE from an HSS or an MME in the LTE EPC. The ANDSF server then generates (402) a policy based on the location information received for the UE and sends (403) the policy to the UE via a first access network. The policy includes an identification of an access point for use by the UE to access an access network different than the first access network.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for policy updating performed by an access network discovery and selection function (ANDSF) server, the method comprising:
   receiving, by the ANDSF server, location information for a user equipment device (UE) from a Long Term Evolution (LTE) Evolved Packet Core (EPC) function, the location information being received from the LTE EPC function rather than from the UE;
   generating, by the ANDSF server, a machine readable, transmittable, and storable policy based on the location information received for the UE;
   sending, by the ANDSF server, the policy to the UE via a first access network, wherein the policy includes an identification of an access point for use by the UE to access a second access network other than the first access network.

2. The method as recited in claim 1, further comprising subscribing, by the ANDSF server, to location updates of the UE from a Home Subscriber Server (HSS) in the LTE EPC.

3. The method as recited in claim 1, further comprising registering, by the ANDSF server, to location information for the UE from a Mobility Management Entity (MME) in the LTE EPC.

4. The method as recited in claim 1, wherein receiving location information for the UE from the LTE EPC comprises receiving location information for the UE from at least one of a Home Subscriber Server (HSS) in the LTE EPC or a Mobility Management Entity (MME) in the LTE EPC.

5. A non-transitory machine-readable storage medium encoded with instructions for execution by an access network discovery and selection function (ANDSF) server for updating policies, the non-transitory machine-readable storage medium comprising instructions for performing the steps of claim 1.

6. The storage medium as recited in claim 5, further comprising instructions for subscribing, by the ANDSF server, to location updates of the UE from a Home Subscriber Server (HSS) in the LTE EPC.

7. The storage medium as recited in claim 5, further comprising instructions for registering, by the ANDSF server, to location information for the UE from a Mobility Management Entity (MME) in the LTE EPC.

8. The storage medium as recited in claim 5, wherein the instructions for receiving location information for the UE from the LTE EPC comprise instructions for receiving location information for the UE from at least one of a Home Subscriber Server (HSS) in the LTE EPC or a Mobility Management Entity (MME) in the LTE EPC.

9. The storage medium of claim 5, wherein the instructions for sending comprise instructions for pushing the policy, by the ANDSF server, to the UE using a PUSH procedure.

10. The method of claim 1, wherein:
    the first access network uses 3G/LTE technology; and
    the second access network uses WiFi technology.

11. The method of claim 1, wherein the sending step comprises pushing the policy, by the ANDSF server, to the UE using a PUSH procedure.

12. An access network discovery and selection function (ANDSF) server for updating policies, the ANDSF server comprising:
    a network interface in communication with a first access network;
    a storage device; and
    a processor in communication with the network interface and the storage device, wherein the processor is configured to:
    receive location information for a user equipment device (UE) from a Long Term Evolution (LTE) Evolved Packet Core (EPC) function, the location information being received from the LTE EPC function rather than from the UE,
    generate a policy based on the location information received for the UE, and
    send the policy to the UE via the first access network, wherein the policy includes an identification of an access point for use by the UE to access a second access network other than the first access network.

13. The ANDSF server as recited in claim 12, wherein the processor is further configured to subscribe to location updates of the UE from a Home Subscriber Server (HSS) in the LTE EPC.

14. The ANDSF server as recited in claim 12, wherein the processor is further configured to register to location information for the UE from a Mobility Management Entity (MME) in the LTE EPC.

15. The ANDSF server as recited in claim 12, wherein being configured to receive location information for the UE from the LTE EPC comprises being configured to receive location information for the UE from at least one of a Home Subscriber Server (HSS) in the LTE EPC or a Mobility Management Entity (MME) in the LTE EPC.

16. The ANDSF server of claim 12, wherein the processor is configured to push the policy to the UE using a PUSH procedure.

17. A method for policy updating performed by an access network discovery and selection function (ANDSF) server, the method comprising:
    receiving, by the ANDSF server, location information for a user equipment device (UE) from one of (i) a Home Subscriber Server (HSS) in a Long Term Evolution (LTE) Evolved Packet Core (EPC) and (ii) a Mobility Management Entity (MME) in the LTE EPC;
    generating, by the ANDSF server, a machine readable, transmittable, and storable policy based on the location information received for the UE;
    sending, by the ANDSF server, the policy to the UE via a first access network, wherein the policy includes an identification of an access point for use by the UE to access a second access network other than the first access network.

18. The method of claim 17, wherein the sending step comprises pushing the policy to the UE using a PUSH procedure.

19. The method of claim 17, further comprising one of (i) subscribing, by the ANDSF server, to location updates of the UE from a Home Subscriber Server (HSS) in the LTE EPC and (ii) registering, by the ANDSF server, to location information for the UE from a Mobility Management Entity (MME) in the LTE EPC.

20. A non-transitory machine-readable storage medium encoded with instructions for execution by an access network discovery and selection function (ANDSF) server for updating policies, the non-transitory machine-readable storage medium comprising instructions for performing the steps of claim 17.

* * * * *